(12) United States Patent
Gorcea et al.

(10) Patent No.: US 6,546,235 B1
(45) Date of Patent: Apr. 8, 2003

(54) SYSTEM FOR CANCELLING DISTORTION IN AN ELECTRONIC CIRCUIT

(75) Inventors: Dan V. Gorcea, Kanata (CA); Carl C. Anderson, Kanata (CA)

(73) Assignee: Nortel Networks Limited, St-Laurent (CA)

( * ) Notice: Subject to any disclaimer, the term of this patent is extended or adjusted under 35 U.S.C. 154(b) by 71 days.

(21) Appl. No.: 09/664,373

(22) Filed: Sep. 18, 2000

(51) Int. Cl.$^7$ .............................. H04B 1/06; H04M 1/24
(52) U.S. Cl. ..................... 455/278.1; 455/63; 455/25; 455/279.1; 379/28
(58) Field of Search .................. 455/423, 424, 455/67.1, 67.4, 279.1, 278.1, 25, 116, 139, 63; 379/28, 21, 22

(56) References Cited

U.S. PATENT DOCUMENTS

| | | | |
|---|---|---|---|
| 4,384,366 A | * | 5/1983 | Kaitsuka .................. 455/287.1 |
| 4,989,262 A | * | 1/1991 | Saito .......................... 455/138 |
| 5,046,133 A | * | 9/1991 | Watanabe .................... 455/138 |
| 5,864,545 A | * | 1/1999 | Gonikberg .................. 370/286 |

* cited by examiner

Primary Examiner—Vivian Chin
Assistant Examiner—John J Lee

(57) ABSTRACT

Generation of a compensation signal for canceling the distortion component of a distorted signal at an affected node, where the distortion component is caused by electromagnetic coupling from a distortion-causing signal source. The distortion-causing signal is coupled into a distortion cancellation system using capacitive or electro-magnetic coupling techniques, resulting in the generation of an induced voltage. The induced voltage is fed to an impedance network and then to a plurality of cells, one for each of the affected nodes. The compensation signal appearing at the output of the cell is combined with the distorted signal at the corresponding affected node. By appropriately selecting the impedance values of the components in the corresponding cell, substantial cancellation of the distortion from the distortion-causing signal source can be achieved. The system can be simplified if the degree to which the distortion-causing signal source couples into the distorted signal is determined ahead of time.

9 Claims, 4 Drawing Sheets

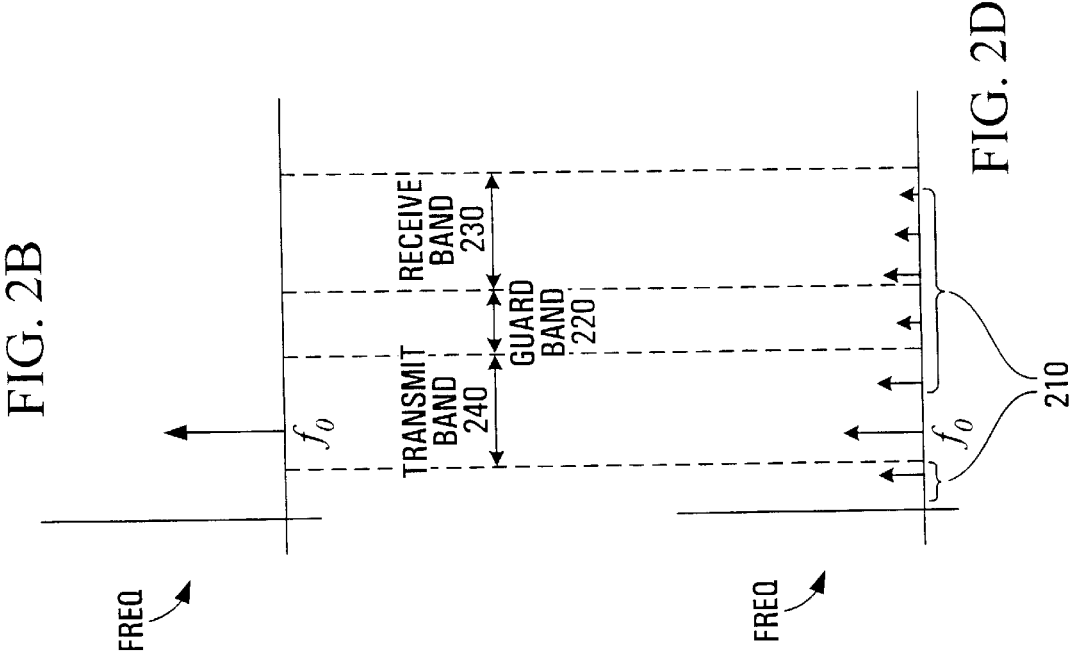
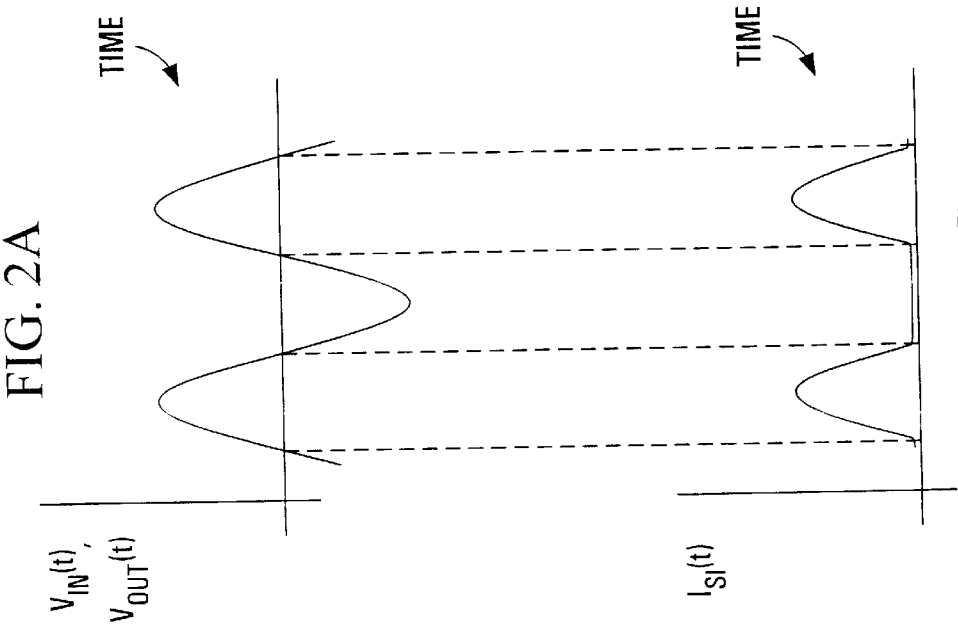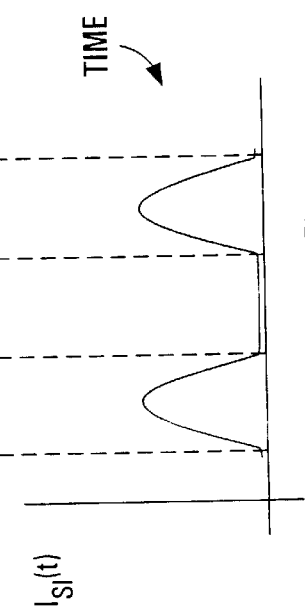

SYSTEM FOR CANCELLING DISTORTION IN AN ELECTRONIC CIRCUIT

FIELD OF THE INVENTION

The present invention relates generally to electronic circuits and, more particularly, to a system for canceling distortion caused by electromagnetic coupling among nodes in such circuits.

BACKGROUND OF THE INVENTION

For millions of homes throughout the world, a convenient way to access a data network such as the Internet is via a data modem connected to a standard, band-limited telephone line. The data modem typically has a transmit amplifier, a receive amplifier and a hybrid which allows full duplex communication of transmit and receive signals across the telephone line.

With the evolution of data networks in general and the Internet in particular, users have begun to demand the speedy transmission of large amounts of data in the form of imagery, music, software downloads and so on. In order to allow data transmission to occur at sufficiently high rates with an acceptable level of accuracy, it is crucial for the transmit and receive amplifiers in the data modem to operate in a highly linear manner. That is to say, the distortion level at the output of each amplifier must be very low compared with the level of the useful signal. In addition, it is important from the customer's point of view that the data modem be inexpensive and consume little power so as to be of a reasonable size without the risk of overheating.

In an attempt to satisfy these constraints, most full duplex data transmission schemes rely on the use of different frequency bands for the transmit and receive signals such that the transmit and receive amplifiers operate in non-overlapping regions of the frequency spectrum. A "guard band" typically separates the transmit and receive frequency bands. The use of distinct frequency bands helps reduce the amount of leakage from the transmit amplifier through the hybrid into the receive amplifier, which in turn reduces the probability that a symbol output by the receive amplifier will be erroneous.

However, there are strict limitations on the width of a guard band that can be used in a practical system when contemplating the transmission of data at high speeds across a standard telephone channel initially designed for voice transmission in the 300–3500 Hz frequency range. Thus, it is often the case that only a narrow guard band separates the transmit and receive frequency bands. It therefore becomes even more important to make the transmit and receive amplifiers linear so as to reduce the likelihood of the transmit signal being distorted and spilling over into the receive band and also to reduce the likelihood of the receive signal being distorted and spilling over into the transmit band. For this reason, the linearity requirements associated with the transmit and receive amplifiers in a data modem are in some cases so severe as to require a difference of 85 dBc between the levels of signal and distortion at the amplifier output.

Unfortunately, regardless of the degree of linearity of a transmit or receive amplifier, use of the amplifier in a full duplex data modem circuit will nevertheless result in the presence of distortion at the amplifier output. Such distortion can be traced to electromagnetic coupling of signals from other areas of the circuit into the signal present at the amplifier input. The amplifier therefore amplifies both the useful signal and the distortion, resulting in the appearance of an amplified useful signal and an amplified distortion component at the output. The presence of an amplified distortion component at the output makes it appear as though the amplifier did not behave linearly whereas the problem is really rooted in the fact that the useful signal at the input to the amplifier was contaminated with electro-magnetically induced distortion to begin with.

This phenomenon is now described in greater detail with reference to FIG. 1, which shows a transmit amplifier 100 and a receive amplifier 150 assumed to be in proximity to one another in a data modem circuit. The transmit amplifier 100 is implemented as a class AB amplifier with two transistors 110, 120 whose emitters are connected together and also to an input stage 130 of a hybrid. An input voltage $V_{IN}(t)$ is applied simultaneously to the base of both transistors 110, 120. When the input voltage $V_{IN}(t)$ is a sinusoid at a frequency fo as shown in FIG. 2A, the transistors 110, 120 conduct during alternating half-cycles of the sinusoid. Assuming the transmit amplifier 100 to be highly linear from an input-output point of view, an output voltage $V_{OUT}(t)$ taken at the emitter junction and prior to the input stage 130 of the hybrid will very closely resemble the input voltage $V_{IN}(t)$ and will thus be a sinusoid at frequency $f_0$.

The frequency content of the input and output voltages $V_{IN}(t)$, $V_{OUT}(t)$ is shown in FIG. 2B. The frequency spectrum is separated into a transmit band 240, a receive band 230 and a guard band 220 which separates the transmit and receive bands. The input voltage $V_{IN}(t)$ and the matching output voltage $V_{OUT}(t)$ are both represented in the frequency spectrum of FIG. 2B by a spike at a frequency $f_0$ in the transmit band 240, which illustrates the sinusoidal nature of the input and output voltages.

However, as now explained, the currents supplying the two transistors 110, 120 exhibit characteristics which are in contrast to those of the input and output voltages $V_{IN}(t)$, $V_{OUT}(t)$. Because each transistor 110, 120 in the class AB amplifier 100 only conducts during alternating half-cycles, the respective supply currents (denoted $I_{S1}(t)$ and $I_{S2}(t)$) will also consist of half-cycles. Those skilled in the art will appreciate that such half-cycles are replete with second- and higherorder distortion components.

By way of example and with reference to FIG. 2C, there is shown a trace of the supply current $I_{S1}(t)$ as a function of time along with its associated frequency content in FIG. 2D. Shown at 210 are multiple distortion components that are basically harmonics of the frequency $f_0$. Beat frequencies may also appear due to the introduction of second-, third- and higher-order distortion components by the amplifier 100 in the presence of DMT-type signals. Since the guard band 220 is relatively narrow, significant ones of the distortion components 210 appear in the receive band 230 and, through electro-magnetic induction, these distortion components will affect the current $I_R(t)$ and the voltage $V_T(t)$ at the input of the receive amplifier 150.

Specifically, the supply current $I_{S1}(t)$ travels around a loop 160 in the data modem circuit which defines a certain surface area. Meanwhile, the input current $I_R(t)$ to the receive amplifier 150, as received from an output stage 140 of the hybrid, travels around a different loop 170 in the data modem circuit which will have a surface area of its own. Due to the mutual proximity of the two loops 160, 170, the supply current $I_{S1}(t)$ feeding the transistor 110 in the transmit amplifier 100 will electro-magnetically couple its way into the voltage $V_T(t)$ and the current $I_R(t)$ at the input of the receive amplifier 150 and will manifest itself as a parasitic distortion component.

This parasitic distortion component depends on the electromagnetic flux induced by loop 160 onto loop 170 (denoted $\phi_{160 \rightarrow 170}$). For instance, considering the effects on the voltage $V_T(t)$, this can be expressed in mathematical terms as:

$$V_T(t) = V_R(t) + V_P(t),$$

where $$V_P(t) = d(\phi_{160 \rightarrow 170})/dt = \alpha \cdot dI_{S1}(t)/dt = \alpha \cdot j\omega \cdot I_{S1}(t),$$

and where $j = \sqrt{-1}$, $\omega$ is the frequency of operation and $\alpha$ is a coupling factor that depends on the dimensions and configurations of the two loops 160 and 170 and on their relative orientation and proximity. The value of $\alpha$ is generally unknown a priori and may be complex, meaning that it introduces an arbitrary change in both magnitude and phase.

Thus, it is seen that due to the effects of electromagnetic induction between the two loops 160 and 170, the supply current $I_{S1}(t)$ (containing distortion components in the receive band 230) will couple into the current $I_R(t)$, consequently distorting the voltage $V_T(t)$ at the input of the receive amplifier 150 regardless of the receive amplifier's inherent linearity characteristics. A similar effect will arise due to the coupling of the supply current $I_{S2}(t)$ into the current $I_R(t)$, which further distorts the voltage $V_T(t)$ at the input of the receive amplifier 150.

Those skilled in the art will appreciate that virtually all push-pull transmit amplifier configurations will similarly cause degradations in the performance of a receive amplifier through the effects of electromagnetic induction. Also, such effects are not limited to degrading the performance of the receive amplifier; for instance, the receive amplifier supply current may conversely influence the input current to the transmit amplifier. Generally, any node in the data modem circuit may cause or be affected by this type of electromagnetically induced distortion.

To combat the above-noted distortion effects, various techniques have been investigated such as reducing the magnitude of the coupling factor a by reducing the areas of the loops 160 and 170 traveled by the currents $I_{S1}(t)$ and $I_R(t)$, respectively. Other techniques have included improving the electrical shielding of the various circuit components, enhancing the grounding topology, etc. However, it should be appreciated that the loop areas can never be completely reduced to zero and that improvements to electrical shielding and grounding involve the undesirable consequence of rendering the data modem more expensive, larger and/or more complex.

Thus, it is clear that conventional approaches to reducing electro-magnetically induced distortion in data modems and other circuits are limited in their effectiveness and/or applicability, with the end result being that useful signals contain non-negligible and often unacceptable levels of distortion.

SUMMARY OF THE INVENTION

The present invention is directed to the cancellation of distortion caused by electro-magnetic coupling among nodes in an electronic circuit. It is assumed that one or more distortion-causing signal sources can be located in the circuit. To cancel the distortion component of a distorted signal at an affected node, a compensation signal is generated for each distortion-causing signal source. The compensation signal for a particular distortion-causing signal source is generated by first inducing a voltage which is a function of the distortion-causing signal. The induced voltage is applied to one or more cells, generally one for each of the affected nodes.

A cell produces a compensation signal whose magnitude and phase are adjustable through selection of the impedance of various ones of the cell's impedance elements. The magnitude and phase of the compensation signal can be controlled such that the magnitude is set to equal substantially that of the distortion component and the phase is set to equal substantially the opposite of that of the distortion component. The compensation signal is then combined with the distorted signal at the affected node, thereby canceling the distortion component and leaving behind a "cleaner" signal.

Therefore, according to a first broad aspect, the invention may be summarized as a system for canceling a distortion component of a distorted signal. The system includes a coupler positioned in proximity to a conductor carrying a distortion-causing signal, for causing the generation of at least one induced voltage that is a function of the distortion-causing signal, and a cell connected to the coupler, for producing a compensation signal as a function of the at least one induced voltage. The cell includes tunable circuit elements for providing control of the magnitude and phase of the compensation signal.

According to another broad aspect, the invention may be summarized as a system for canceling a distortion component present in multiple distorted signals and arising from electro-magnetic interaction with a distortion-causing signal source. The system includes a coupler positioned in proximity to the distortion-causing signal source, for producing at least one induced voltage that is a function of the distortion-causing signal and, for each distorted signal, a cell connected to the coupler, for producing a corresponding compensation signal as a function of the at least one induced voltage. Again, each cell includes tunable impedance elements for providing control of the magnitude and phase of the corresponding compensation signal.

According to yet another broad aspect, the invention may be summarized as a method of canceling a distortion component of a distorted signal in an electronic circuit. The method includes coupling a distortion-causing signal so as to generate at least one induced voltage that is a function of the distortion-causing signal; generating a compensation signal as a function of the at least one induced voltage and as a function of the impedance of at least one tunable impedance element; and combining the compensation signal with the distorted signal to achieve at least partial distortion cancellation.

The invention may be summarized according to still another broad aspect as a method of canceling a distortion component of a distorted signal in an electronic circuit, including electro-magnetically extracting a portion of a distortion-causing signal to produce two opposite-signed induced voltages that are each a function of the distortion-causing signal; generating a compensation signal as a function of the two induced voltages and as a function of the impedance of at least one tunable impedance element; and varying the impedance of the at least one tunable impedance element until at least partial distortion cancellation is achieved.

BRIEF DESCRIPTION OF THE DRAWINGS

These and other aspects and features of the present invention will now become apparent to those of ordinary skill in the art upon review of the following description of specific embodiments of the invention in conjunction with the accompanying drawings, in which:

FIG. 2A shows a time domain plot of an example voltage signal at the input and output of the transmit amplifier of FIG. 1;

FIG. 2B shows a frequency-domain plot of the voltage signal of FIG. 2A;

FIG. 2C shows a time-domain plot of an example current signal supplying one of the transistors in the transmit amplifier of FIG. 1;

FIG. 2D shows a frequency-domain plot of the current signal of FIG. 2C;

DETAILED DESCRIPTION OF THE PREFERRED EMBODIMENTS

Figure 1:
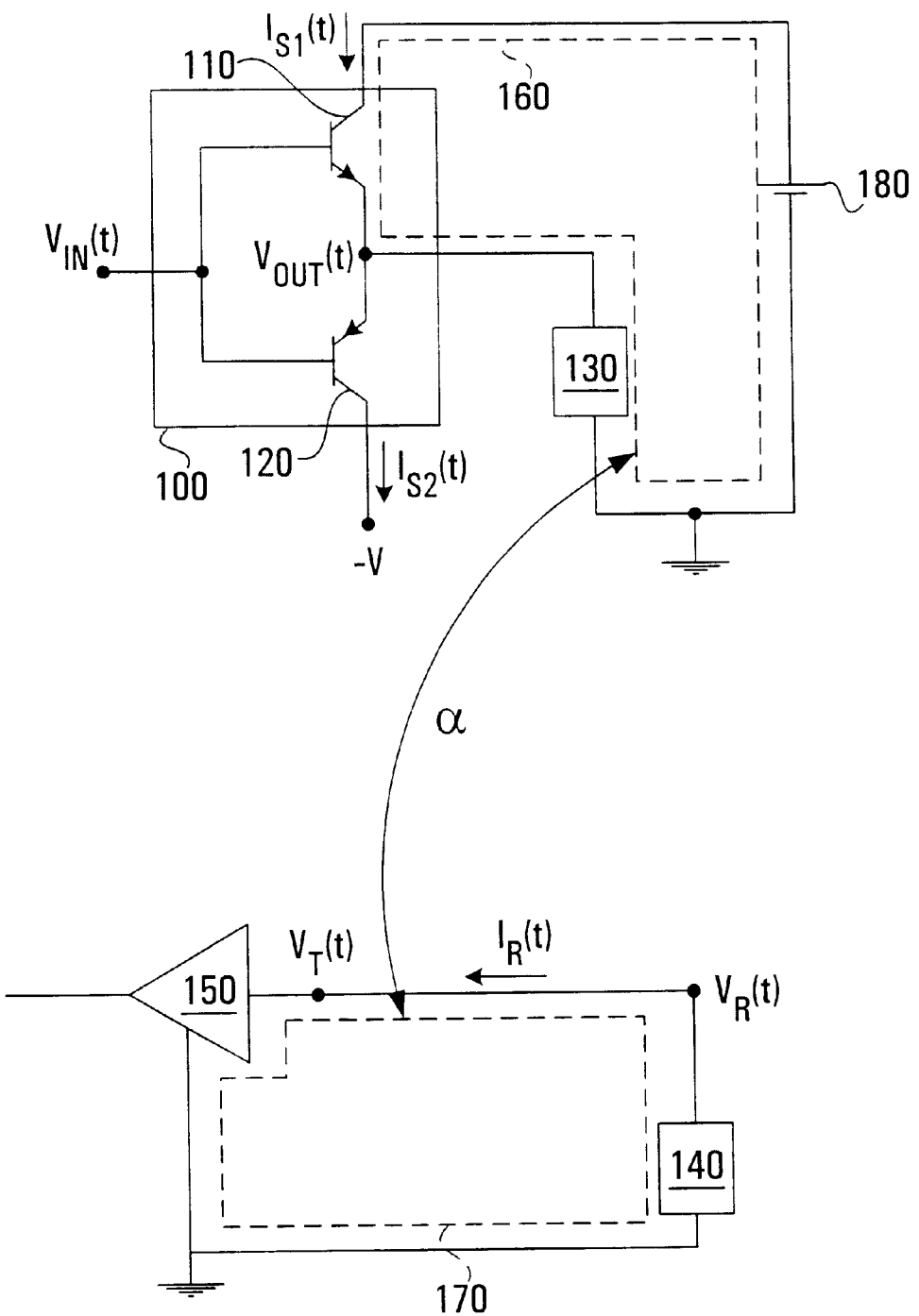
FIG. 1 shows, in schematic form, part of a data modem comprising a transmit amplifier and a receive amplifier in proximity to one another.
Figure 3:
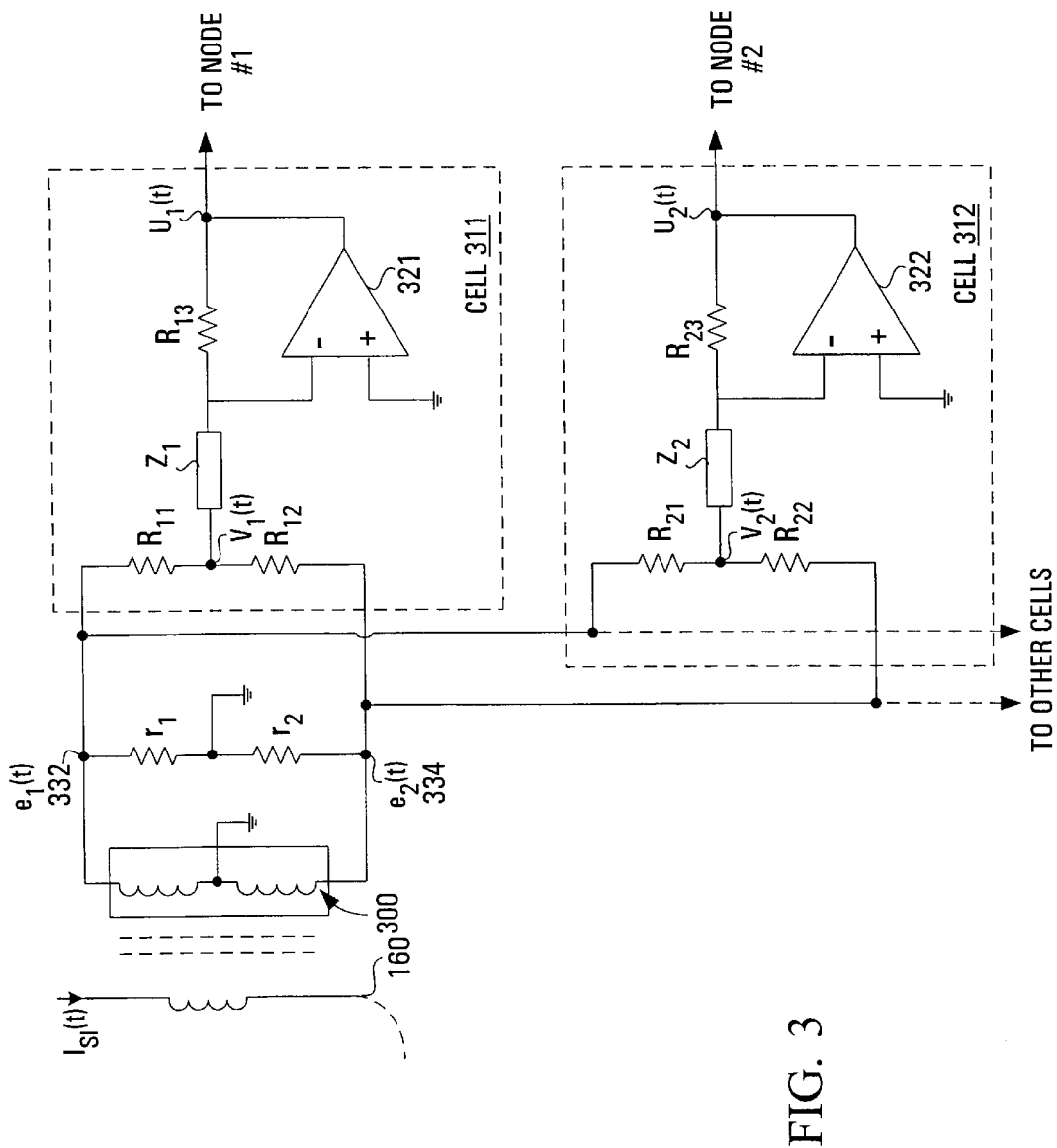
FIG. 3 shows, in schematic form, a distortion cancellation system incorporated within a data modem circuit, according to an embodiment of the invention.

With reference to FIG. 3, there is shown a distortion cancellation system in accordance with an embodiment of the invention. At one end, the system is placed in proximity to a distortion-causing signal source (for example, loop 160 carrying the supply current $I_{S1}(t)$). At the other end, the system is connectable to one or more affected nodes (for example, the input of the receive amplifier 150) into which the distortion-causing signal source has electro-magnetically coupled.

In the process of coupling from one area of the circuit into the affected node, the distortion-causing signal may undergo a variation in either magnitude or phase or both. The distortion cancellation system of the present invention counters this effect by generating a version of the distortion-causing signal which has substantially the same magnitude but an opposite phase. Although the magnitude and phase of the coupling factor a may be unknown a priori, various elements of the distortion cancellation system are tunable in order to allow a desired level of cancellation to be achieved after the circuit is manufactured.

The distortion cancellation system comprises several parts. Firstly, there is provided a coupler 300 for transforming a portion of the distortion-causing signal $I_{S1}(t)$ into at least one induced voltage. In the illustrated embodiment, the coupler produces two induced voltages, namely, a positive induced voltage (denoted $e_1(t)$) at a terminal 332 and a negative induced voltage (denoted $e_2(t)$) at a terminal 334. It will be later shown that in some cases, the production of only one induced voltage may be sufficient.

The coupler 300 may be provided in the form of two secondary windings placed in close proximity to a loop or twist in the wire or integrated circuit track carrying the supply current $I_{S1}(t)$. Thus, the coupler 300 and the conductor carrying the supply current $I_{S1}(t)$ act as a coreless transformer. The secondary windings may be similarly created in a length of wire or on an integrated circuit track. A ground reference is connected between the two secondary windings, which causes the two induced voltages $e_1(t)$ and $e_2(t)$ to be of opposite sign. If the secondary windings have the same number of turns, then the two induced voltages will have substantially the same magnitude.

Secondly, the distortion cancellation system comprises an optional common impedance network which is connected to the two terminals 332, 334 of the coupler 300 carrying the opposite-signed induced voltages $e_1(t)$ and $e_2(t)$. The impedance network may consist of a pair of resistors $r_1$, $r_2$, each of which is connected at one of its two ends to a respective one of the terminals 332, 334. The other end of resistor $r_1$ is joined to the other end of resistor $r_2$, and this junction point is connected to the ground reference.

The impedance network is optional. It is not required when the loop or twist in the conductor carrying the supply current $I_{S1}(t)$ has a low inductance (and consequently a low output impedance). When the inductance is relatively high, however, an impedance network connected to the coupler 300 as shown in FIG. 3 provides a reduction in the effective output impedance of the coupler. The low output impedance consequently reduces the effect of the coupler on other circuit components.

Finally, one or more "cells" 311, 312, . . . are connected in parallel to terminals 332 and 334. The $k^{th}$ cell (generally denoted 31k and shown in FIG. 4 but not shown in FIG. 3) is basically a circuit which produces a compensation voltage $U_k(t)$ from the two induced voltages $e_1(t)$, $e_2(t)$. The compensation voltage $U_k(t)$ can then be added to the distorted signal at the affected node either directly or via an intervening resistor (not shown). In a more general sense, therefore, each cell generates a compensation "signal" (i.e., voltage or current) which is then added to the distorted signal by means of a combiner.

Considering cell 311, there are shown two resistors $R_{11}$, $R_{12}$, each of which is connected at one end to a respective one of the terminals 332, 334. The other end of resistor $R_{11}$ is joined to the other end of resistor $R_{12}$, and this junction point is connected to one end of an impedance element $Z_1$. Another end of the impedance element $Z_1$ is connected to an inverting input terminal of an operational amplifier 321. The operational amplifier 321 is connected in a non-inverting configuration by virtue of a resistor $R_{13}$ located between its output terminal and its inverting input terminal. The compensation voltage $U_1(t)$ appears at the output terminal of the operational amplifier 321.

If the distorted signal in need of compensation at the $k^{th}$ affected node is a distorted voltage signal, then the compensation voltage $U_k(t)$ can be added directly thereto by means of a transformer, operational amplifier or any other suitable voltage addition device. On the other hand, if the distorted signal in need of compensation at the $k^{th}$ affected node is a distorted current signal, then the compensation voltage Uk(t) can be applied across an intervening resistor and the resultant current can be combined with the distorted current using an electrical junction point or any other suitable current addition device. For the purposes of illustration and simplicity, it will be assumed in the following discussion that the distorted signal is a voltage signal, with the understanding that those skilled in the art will be capable of adapting the circuit to the compensation of a distorted current signal.

Figure 4:
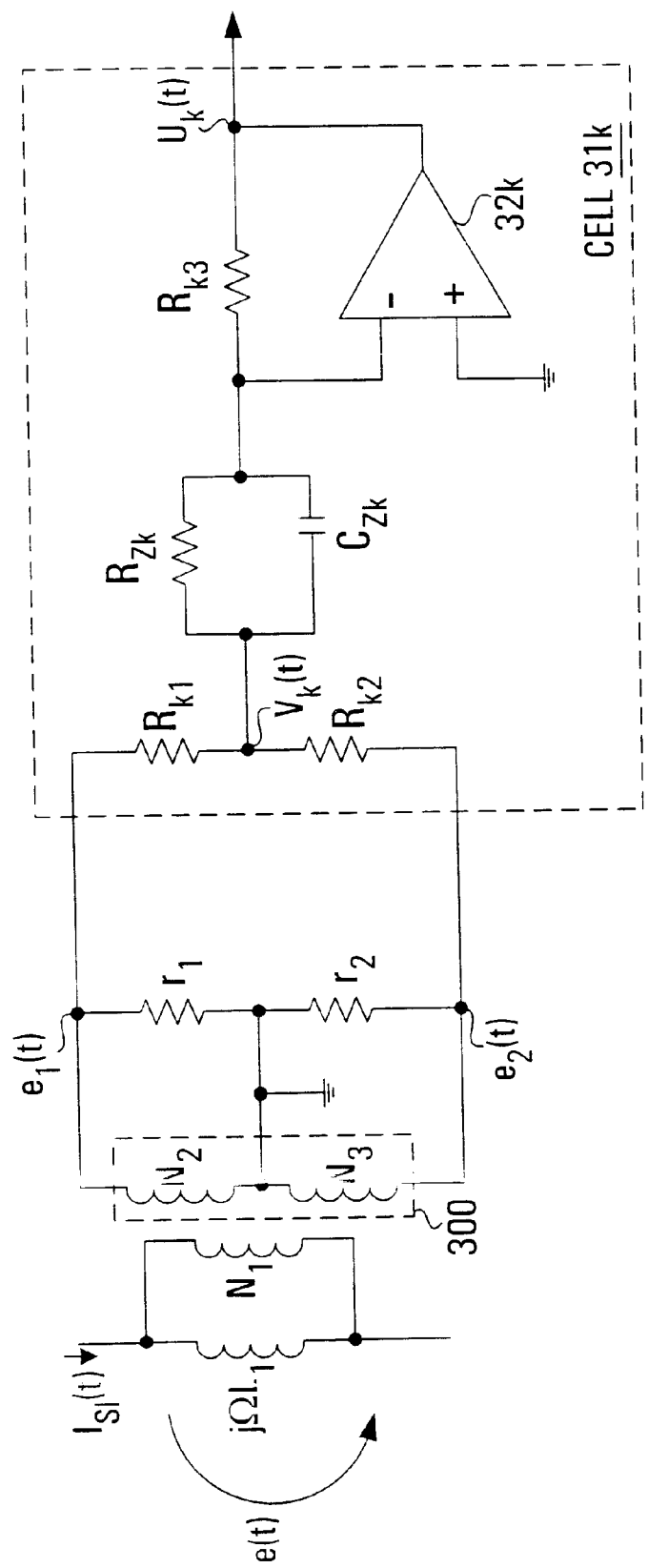
FIG. 4 shows in greater detail part of the distortion cancellation system of FIG. 3.

According to an embodiment of the present invention, some of the parameters within each of the cells 311, 312, . . . are tunable to enable the respective compensation voltage $u_1(t)$, $u_2(t)$, . . . to take on a value which has a desired magnitude ratio and phase offset with respect to the supply current $I_{S1}(t)$. To this end, FIG. 4 shows a slightly more detailed schematic diagram of the components of the distortion cancellation system of FIG. 3 as they pertain to the $k^{th}$ affected node. Thus, all cells except the $k^{th}$ cell 31k have been omitted from FIG. 4.

In the illustrated example, the coupler 300 in combination with the conductor carrying the supply current $I_{S1}(t)$ behaves as a non-ideal transformer. This combination can be modeled as an ideal transformer (with 1 primary winding and 2 secondary windings) in parallel with and an inductor having an impedance jωL. The primary winding of the ideal transformer generally has $N_1$ turns, while the secondary windings have $N_2$ and $N_3$ turns, respectively. It is also noted that impedance element $Z_k$ is modeled as a resistive-capacitive (RC) network comprising a resistor $R_{Zk}$ in parallel with a capacitor $C_{Zk}$. Generally, it is suitable to use any complex impedance network.

As will now be shown, the compensation voltage Uk(t) at the output of the $k^{th}$ cell 31k is a magnitude- and phase-modified version of the supply current $I_{S1}(t)$. To determine the relationship between the compensation voltage Uk(t) and the supply current $I_{S1}(t)$, it is convenient to proceed as follows: (1) determine the relationship between the compensation voltage Uk(t) and a voltage $V_k(t)$ at the junction between resistors $R_{k1}$ and $R_{k2}$; (2) determine the relationship between $V_k(t)$ and the induced voltages $e_1(t)$ and $e_2(t)$; (3) determine the relationship between the induced voltages $e_1(t)$, $e_2(t)$ and the voltage e(t) across the primary winding of the coupler 300; and (4) determine the relationship between e(t) and the supply current $I_{S1}(t)$.

Following this order, basic circuit analysis yields:

$$Uk(t)=V_k(t)*(R_{k3}/Z_k)=V_k(t)*(R_{k3}/(R_{Zk}\|(1/j\omega C_{Zk}))); \quad (1)$$

$$V_k(t)=(R_{k2}/(R_{k1}+R_{k2}))*e_1(t)-(R_{k1}/(R_{k1}+R_{k2}))*e_2(t), \quad (2)$$

for $$r_1, r_2 << R_{k1}, R_{k2} << |Z_k|;$$

$$e_1(t)=(N_2/N_1)*e(t); \quad (3)$$

$$e_2(t)=-(N_3/N_1)*e(t);$$

$$e(t)=I_{S1}(t)*(Z_{in}\|j\omega L), \quad (4)$$

where $$Z_{in}=r_1*(N_1/N_2)^2+r_2*(N_1/N_3)^2$$

for $$r_1, r_2 << R_{k1}, R_{k2} << |Z_k|.$$

By substituting (4) into (3) into (2) into (1), one can obtain a generalized formula which gives Uk(t) as a function of the various circuit parameters and $I_{S1}(t)$, whereby variation of the circuit parameters can be used to control the magnitude and phase of Uk(t).

As an illustrative example, a simplified case is considered. Assuming $r_1$ to be equal to $r_2$ (and simply denoted "r") and also assuming $N_2$ to be equal to $N_3$ (and simply denoted "N"), it is seen from (3) that $e_1(t)=-e_2(t)$ and thus substitution of (2) into (1) under these circumstances results in:

$$Uk(t)=((R_{k2}-R_{k1})/(R_{k1}+R_{k2}))*(R_{k3}/(R_{Zk}\|(1/j\omega C_{Zk})))*e(t). \quad (5)$$

Finally, substituting (4) into (3) into (5), one obtains:

$$Uk(t)=((R_{k2}-R_{k1})/(R_{k1}+R_{k2}))*(R_{k3}/(R_{Zk}\|(1/j\omega C_{Zk})))*(N/N_1)*(j\omega L\|((r/2)(N_1/N)^2))*I_{S1}(t). \quad (6)$$

Thus, it is seen that Uk(t) is proportional to $I_{S1}(t)$ and can be given any desired phase by controlling $R_{k3}$, $R_{Zk}$ and $C_{Zk}$, while its magnitude can be controlled by varying $R_{k1}$ and $R_{k2}$, as long as each of $R_{k1}$, $R_{k2}$ remain significantly greater than either of $r_1$, $r_2$ and significantly less than the magnitude of $(R_{Zk}\|1/j\omega C_{Zk})$.

The desired values of the magnitude and phase depend on the extent to which the supply current $I_{S1}(t)$ has coupled into the distorted signal at the $k^{th}$ affected node, as governed by a coupling factor α. This coupling factor depends on the relative size, configuration and orientation of the perturbing and perturbed current loops.

In some cases, it may be possible to model the circuit with such precision that an accurate analytical value of the coupling factor a can be obtained, thus revealing the precise change in magnitude and phase undergone by $I_{S1}$t) as it couples into the $k^{th}$ affected node. The desired magnitude of Uk(t) could thus be selected as the magnitude of the analytically obtained coupling factor while the desired phase could be selected as the opposite of the phase of the analytically obtained coupling factor.

In other cases, the configuration of the circuit is so complex that it becomes inconvenient or impossible to determine the coupling factor ahead of manufacturing time. In order to nevertheless obtain a desired level of distortion cancellation, it may be necessary to tune some combination of the values of $R_{k1}$, $R_{k2}$, $R_{k3}$, $R_{Zk}$ and $C_{Zk}$ after the circuit has already been built. In order to determine what value to give each impedance element, it is within the scope of the invention to separately test combinations or individual ones of the impedance elements (with the others open-circuited) throughout a range of impedance values until satisfactory distortion cancellation is achieved for some combination of impedance elements and impedance values.

It should be noted that since the geometry of the circuit generally remains fixed over time, the degree of cancellation obtained by virtue of selecting $R_{k1}$, $R_{k2}$, $R_{k3}$, $R_{Zk}$ and $C_{Zk}$ for the $k^{th}$ cell is likely to remain constant regardless of the values for the analogous components in other cells. This is especially true if $r_1$, $r_2$ remain much less than $R_{k1}$, $R_{k2}$ and if $R_{k1}$, $R_{k2}$ remain much less than the magnitude of $Z_k$.

It should also be understood that in those cases where the coupling factor α can indeed be obtained in advance of building the circuit, certain simplifications to the distortion cancellation circuit can be achieved. For instance, if the desired phase of Uk(t) with respect to $I_{S1}(t)$ is positive, then the contribution of the $e_2(t)$ at point 334 in the distortion cancellation circuit is not required. Thus, only one secondary winding (the one with $N_1$ turns) would be required. Also, resistor $R_{k2}$(and resistor $r_2$ if an additional impedance network is used) could be omitted.

Once the compensation voltage Uk(t) with the desired magnitude and phase has been obtained, it can be applied to the distorted signal at the $k^{th}$ affected node in a variety of ways. As already mentioned, the manner in which this is achieved depends on whether the distorted signal at the $k^{th}$ affected node is a voltage or a current. For example, if the distorted signal is a voltage signal, then the compensation voltage may be added to the distorted signal using a voltage combining device such as an operational amplifier or transformer. On the other hand, if the distorted signal is a current signal, then the output terminal may be connectable directly to the affected node or it may have to pass through an intervening resistor, depending on the output impedance of the previous stage at the affected node. Those skilled in the art will know of myriad other ways of combining Uk(t) with the distorted signal at the $k^{th}$ affected node.

Those skilled in the art will also recognize that there exist other ways of coupling a distortion-causing signal into the distortion cancellation system. When the distortion-causing signal is a current signal, as in the examples described herein above, suitable techniques include but are not limited to the use of discrete current transformer devices or board-level printed transformers formed on superimposed conductive layers of an integrated circuit. Alternatively, when the distortion-causing signal is a voltage signal, it is suitable to use capacitive coupling techniques or other techniques which will be known to those of ordinary skill in the art.

Moreover, it should be understood that use of the above equations is an attempt at conveying, in convenient mathematical form, the basic operation of the distortion cancellation circuit. The equations assume certain ideal properties of transformers, resistors, capacitors, inductors, operational amplifiers, etc., but of course these components may be used even if their behaviour is not entirely as modeled. Adherence to the models presented herein above is desirable if an analytical cancellation scheme is implemented but in the case where tuning of the various impedance elements in an already manufactured system is performed until satisfactory cancellation is achieved, adherence to mathematical models is of less importance.

Other variations of the above embodiments are also within the scope of the invention. For instance, when two secondary windings are used, it is not necessary to place the ground reference in such a way that each of the secondary windings will have the same number of terms. Thus, it is within the scope of the invention to have $N_2$ not equal to $N_3$. Similarly, the resistance of resistor $r_1$ need not equal that of resistor $r_2$ Is a common impedance network is used.

Furthermore, it is within the scope of the invention to replace each of the components identified as a resistor or a capacitor with a more general impedance element in order to provide further flexibility in controlling the magnitude and phase of the compensation voltage being applied to the $k^{th}$ affected node. Also, it is within the scope of the invention to use other types of impedance networks for impedance element $Z_k$ in place of the resistive-capacitive (RC) network shown in FIG. 4 to comprise a resistor $R_{Zk}$ in parallel with a capacitor $C_{Zk}$.

The above description has focused on describing the invention in the context of distortion cancellation at each of at least one affected node due to electro-magnetic coupling from a single distortion-causing signal source. Nonetheless, it should be understood that the present invention is applicable more generally in the context of canceling distortion at any number of affected nodes from any number of distortion-causing signal sources, be they distortion-causing current sources or distortion-causing voltage sources.

While specific embodiments of the present invention have been described and illustrated, it will be apparent to those skilled in the art that numerous modifications and variations can be made without departing from the scope of the invention as defined in the appended claims.

We claim:

1. A system for canceling a distortion component of a distorted signal, comprising:

a coupler positioned in proximity to a conductor carrying a distortion-causing signal, for causing the generation of at least one induced voltage that is a function of the distortion-causing signal; and a cell connected to the coupler, for producing a compensation signal as a function of the at least one induced voltage;

wherein the cell comprises tunable circuit elements for providing control of the magnitude and phase of the compensation signal;

wherein the coupler comprises a first winding and a second winding, wherein the first and second windings each have a mutually connected end, wherein another end of the first winding is at a first induced voltage and wherein another end of the second winding is at a second induced voltage having a sign opposite to that of the first induced voltage.

2. A system as claimed in claim 1, further comprising a signal combiner connected to the cell and being adapted to apply the compensation signal to the distorted signal.

3. A system as claimed in claim 2, wherein said circuit elements have impedance values which impart to the compensation signal a magnitude substantially equal to that of the distortion component and a phase substantially opposite to that of the distortion component.

4. A system for canceling a distortion component of a distorted signal, comprising:

a coupler positioned in proximity to a conductor carrying a distortion-causing signal, for causing the generation of at least one induced voltage that is a function of the distortion-causing signal; and a cell connected to the coupler, for producing a compensation signal as a function of the at least one induced voltage;

wherein the cell comprises tunable circuit elements for providing control of the magnitude and phase of the compensation signal;

a signal combiner connected to the cell and being adapted to apply the compensation signal to the distorted signal;

an impedance network connected between the coupler and the cell, for lowering the effective output impedance of the coupler;

wherein the coupler comprises a first winding and a second winding, wherein the first and second windings each have a mutually connected end, wherein another end of the first winding is at a first induced voltage and wherein another end of the second winding is at a second induced voltage having a sign opposite to that of the first induced voltage; and wherein the impedance network comprises a first resistor and a second resistor, wherein the first and second resistors have a mutually connected end, wherein another end of the first resistor is connected to said other end of the first winding and wherein another end of the second resistor is connected to said other end of the second winding.

5. A system as claimed in claim 4, wherein the mutually grounded ends of the first and second windings and of the first and second resistors are all grounded.

6. A system for canceling a distortion component of a distorted signal, comprising:

a coupler positioned in proximity to a conductor carrying a distortion-causing signal, for causing the generation of at least one induced voltage that is a function of the distortion-causing signal; and a cell connected to the coupler, for producing a compensation signal as a function of the at least one induced voltage;

wherein the cell comprises tunable circuit elements for providing control of the magnitude and phase of the compensation signal;

wherein the cell comprises a resistor connected to the coupler, a complex impedance network connected to the resistor and a non-inverting operational amplifier configuration connected to the complex impedance network.

7. A system as claimed in claim 6, wherein the complex impedance network is a resistive-capacitive network.

8. A system as claimed in claim 6, further comprising a second impedance network connected between the coupler and the cell, for lowering the effective output impedance of the coupler.

9. A method of canceling a distortion component of a distorted signal in an electronic circuit, comprising:

electro-magnetically extracting a portion of a distortion-causing signal to produce two opposite-signed induced voltages that are each a function of said distortion-causing signal;

generating a compensation signal as a function of the two induced voltages and as a function of the impedance of at least one tunable impedance element; and varying the impedance of the at least one tunable impedance element until at least partial distortion cancellation is achieved.

* * * * *